United States Patent
Chang

(10) Patent No.: US 11,281,331 B2
(45) Date of Patent: *Mar. 22, 2022

(54) TOUCH SENSITIVE PROCESSING APPARATUS, SYSTEM AND METHOD THEREOF

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,316

(22) Filed: Jul. 2, 2020

(65) Prior Publication Data

US 2020/0333900 A1 Oct. 22, 2020

Related U.S. Application Data

(63) Continuation of application No. 15/976,171, filed on May 10, 2018, now Pat. No. 10,739,920.

(60) Provisional application No. 62/504,684, filed on May 11, 2017.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04104* (2013.01)

(58) Field of Classification Search
CPC .................. G06F 3/044; G06F 3/0418; G06F 2203/04104; G06F 2203/04111; G06F 2203/04112

USPC ........................................................ 345/174
See application file for complete search history.

(56) References Cited

U.S. PATENT DOCUMENTS

| | | | |
|---|---|---|---|
| 9,606,685 B2 | 3/2017 | Chang et al. | |
| 10,739,920 B2 * | 8/2020 | Chang ................. | G06F 3/04186 |
| 2011/0084928 A1 | 4/2011 | Chang et al. | |
| 2012/0043977 A1 | 2/2012 | Kremin et al. | |
| 2012/0075250 A1 | 3/2012 | Chang et al. | |
| 2013/0038573 A1 | 2/2013 | Chang et al. | |
| 2013/0069905 A1 | 3/2013 | Krah et al. | |
| 2014/0062949 A1 | 3/2014 | Chang et al. | |

(Continued)

FOREIGN PATENT DOCUMENTS

| CN | 104636911 A | 5/2015 |
|---|---|---|
| CN | 104750333 | 11/2017 |

*Primary Examiner* — Jimmy H Nguyen
(74) *Attorney, Agent, or Firm* — WPAT, PC

(57) ABSTRACT

A touch sensitive processing method comprising: generating sensing information sensed by first electrodes and second electrodes simultaneously as a first and a second set, respectively; according to one or more first touch line pieces corresponding to one or more external objects in the first set, transmitting driving signals via one or more of the first electrodes corresponding to one or more first touch line pieces, and sensing the driving signals via the multiple second electrodes to form one-dimensional sensing information; reserving a part of the one-dimensional sensing information which corresponds to at least one second touch line piece of one or more external objects in the second set to be at least one line piece; composing at least one line piece group according to the line piece; calculating one position of the external object according to the line piece group.

9 Claims, 11 Drawing Sheets

(56) References Cited

U.S. PATENT DOCUMENTS

2014/0362036 A1 12/2014 Mo et al.
2015/0109250 A1 4/2015 Chang et al.
2015/0130756 A1 5/2015 Chang et al.

* cited by examiner

TOUCH SENSITIVE PROCESSING APPARATUS, SYSTEM AND METHOD THEREOF

CROSS REFERENCE TO RELATED APPLICATIONS

This application is a continuation of U.S. patent application Ser. No. 15/976,171, filed on May 10, 2018, which claims priority to U.S. patent application, 62/504,684, filed on May 11, 2017, the disclosure of which is incorporated herein by reference.

BACKGROUND OF THE INVENTION

1. Field of the Invention

The present invention relates to the field of touch sensitive processing method, and more particularly, to a capacitance touch sensitive processing method.

2. Description of the Prior Art

When area of a touch sensitive screen increases and quantities of electrodes of the touch sensitive screen also grows, the time duration for performing mutual-capacitance touch sensing becomes longer. This phenomenon causes a touch sensitive processing apparatus to have a lower rate of reporting touch sensing information to an electronic system, and further causing the response time of the electronic system to user(s) to be increased or delayed. It is not good to user's experience. Thus, one of the objects of the present invention is to provide a new touch sensitive processing method to speed up the sensing rate of capacitance touch sensing, increase the reporting frequency of touch sensing information, and further reduce the response time of the electronic system to user(s), and these developments benefit user's experience.

SUMMARY OF THE INVENTION

According to one embodiment of the present invention, it provides a touch sensitive processing apparatus configured to connect a touch sensitive panel or screen. The touch sensitive panel or screen includes multiple first electrodes being parallel with a first axis and multiple second electrodes being parallel with a second axis. Multiple sensing points are formed by the intersections of the multiple first electrodes and the multiple second electrodes. The touch sensitive processing apparatus includes a driving circuit, a sensing circuit, and a processing module for controlling the driving circuit and the sensing circuit. The processing module reads programs from a non-volatile memory and executes them for performing the following steps: generating sensing information sensed by the multiple first electrodes simultaneously from the sensing circuit as a first set; generating sensing information sensed by the multiple second electrodes at the same time from the sensing circuit as a second set; according to one or more first touch line pieces corresponding to one or more external objects in the first set, having the driving circuit transmit driving signals via one or more first electrodes corresponding to the one or more first touch line pieces, and having the sensing circuit sense the driving signals via the multiple second electrodes to form at least a one-dimensional sensing information; composing a two-dimensional sensing information according to the at least a one-dimensional sensing information; preserving sensing information which corresponds to one or more second touch line pieces in the two-dimensional sensing information, wherein the one or more second touch line pieces is a part of a second set which corresponds to the one or more external objects; calculating one or more positions of the one or more external objects according to the two-dimensional sensing information; and reporting the one or more positions.

According to one embodiment of the present invention, it provides a touch sensitive processing system. The touch sensitive processing system includes the abovementioned touch sensitive panel or screen and the aforesaid touch sensitive processing apparatus.

According to one embodiment of the present invention, it provides a touch sensitive processing method adaptive for a touch sensitive processing apparatus. The touch sensitive processing apparatus connects a touch sensitive panel or screen. The touch sensitive panel or screen includes multiple first electrodes being parallel with a first axis and multiple second electrodes being parallel with a second axis. Multiple sensing points are formed by the intersections of the multiple first electrodes and the multiple second electrodes. The touch sensitive processing method includes: generating sensing information sensed by the multiple first electrodes simultaneously from a sensing circuit of the touch sensitive processing apparatus as a first set; generating sensing information sensed by the multiple second electrodes at the same time from the sensing circuit as a second set; according to one or more first touch line pieces corresponding to one or more external objects in the first set, having a driving circuit of the touch sensitive processing apparatus transmit driving signals via one or more first electrodes corresponding to the one or more first touch line pieces, and having the sensing circuit sense the driving signals via the multiple second electrodes to form at least a one-dimensional sensing information; composing a two-dimensional sensing information according to the at least a one-dimensional sensing information; preserving sensing information which corresponds to one or more second touch line pieces in the two-dimensional sensing information, wherein the one or more second touch line pieces is a part of a second set which corresponds to the one or more external objects; calculating one or more positions of the one or more external objects according to the two-dimensional sensing information; and reporting the one or more positions.

According to one embodiment of the present invention, it provides a touch sensitive processing apparatus configured to connect a touch sensitive panel or screen. The touch sensitive panel or screen includes multiple first electrodes being parallel with a first axis and multiple second electrodes being parallel with a second axis. Multiple sensing points are formed by the intersections of the multiple first electrodes and the multiple second electrodes. The touch sensitive processing apparatus includes a driving circuit, a sensing circuit, and a processing module for controlling the driving circuit and the sensing circuit. Wherein, the processing module reads programs from a non-volatile memory and executes them for performing the following steps: generating sensing information sensed by the multiple first electrodes simultaneously from the sensing circuit as a first set; generating sensing information sensed by the multiple second electrodes at the same time from the sensing circuit as a second set; according to one or more first touch line pieces corresponding to one or more external objects in the first set, having the driving circuit transmit driving signals via one or more first electrodes corresponding to the one or more first touch line pieces, and having the sensing circuit sense the driving signals via the multiple second electrodes to form at least a one-dimensional sensing information; preserving a part of the at least a one-dimensional sensing information which corresponds to at least one second touch line piece of the one or more external objects in the second set to be at least one line piece; composing at least one line piece group according to the at least one line piece; calculating one or more positions of the one or more external objects according to the at least one line piece group; and reporting the one or more positions.

According to one embodiment of the present invention, it provides a touch sensitive processing system. The touch sensitive processing system includes the abovementioned touch sensitive panel or screen and the aforesaid touch sensitive processing apparatus.

According to one embodiment of the present invention, it provides a touch sensitive processing method adaptive for a touch sensitive processing apparatus. The touch sensitive processing apparatus connects a touch sensitive panel or screen. The touch sensitive panel or screen includes multiple first electrodes being parallel with a first axis and multiple second electrodes being parallel with a second axis. Multiple sensing points are formed by the intersections of the multiple first electrodes and the multiple second electrodes. The touch sensitive processing method includes: generating sensing information sensed by the multiple first electrodes simultaneously from a sensing circuit of the touch sensitive processing apparatus as a first set; generating sensing information sensed by the multiple second electrodes at the same time from the sensing circuit as a second set; according to one or more first touch line pieces corresponding to one or more external objects in the first set, having a driving circuit of the touch sensitive processing apparatus transmit driving signals via one or more first electrodes corresponding to the one or more first touch line pieces, and having the sensing circuit sense the driving signals via the multiple second electrodes to form at least a one-dimensional sensing information; having a processing module of the touch sensitive processing apparatus preserve a part of the at least a one-dimensional sensing information which corresponds to at least one second touch line piece of the one or more external objects in the second set to be at least one line piece; having the processing module compose at least one line piece group according to the at least one line piece; having the processing module calculate one or more positions of the one or more external objects according to the at least one line piece group; and having the processing module report the one or more positions.

According to the touch sensitive processing apparatuses, systems, and methods provided by the abovementioned embodiments, the sensing rate of capacitance touch sensing can be speeded up, the reporting frequency of touch sensing information can be increased, and the response time of the electronic system to user(s) can be further reduced, and these developments benefit user's experience.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
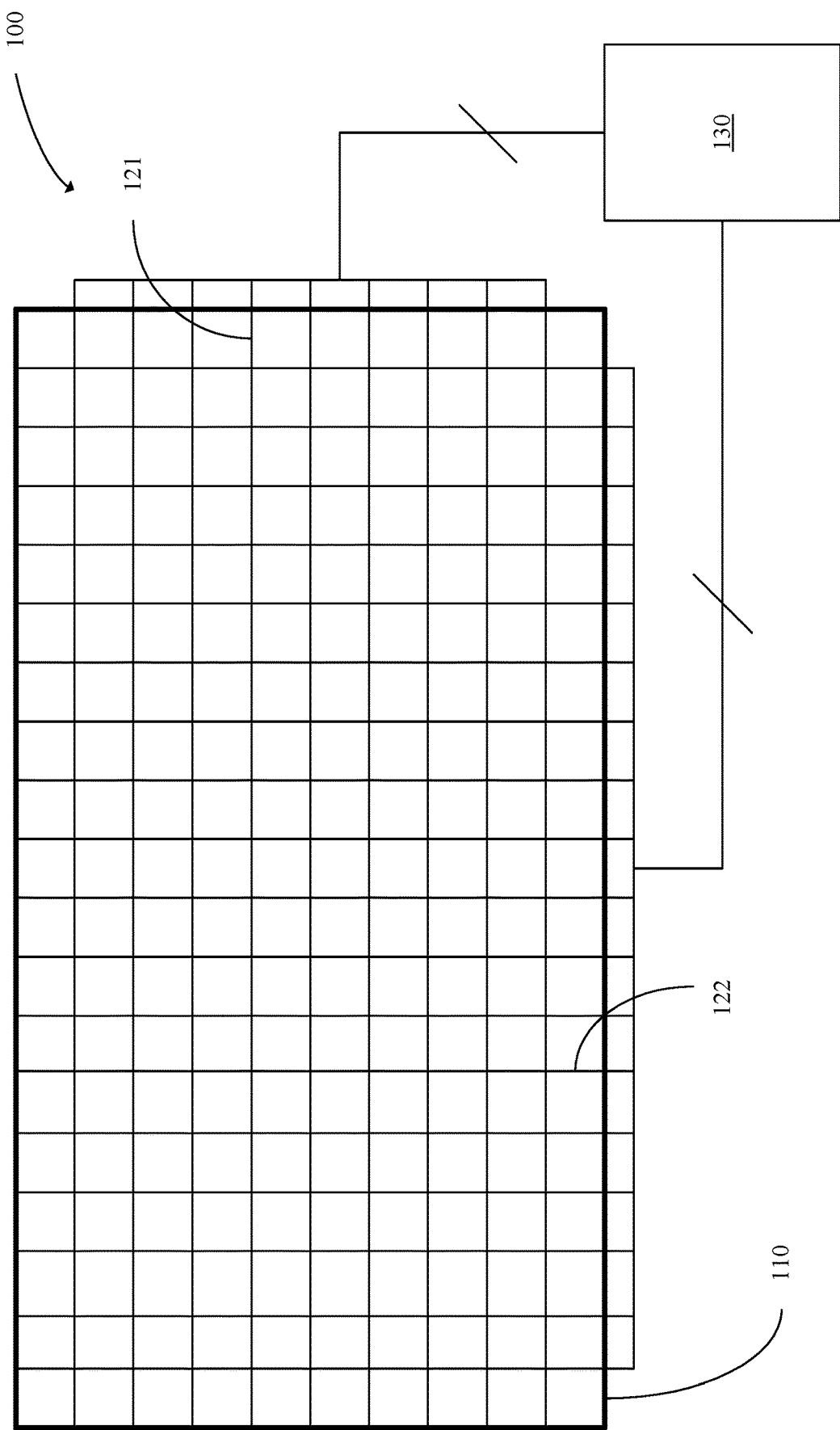
FIG. 1 shows a schematic diagram of a touch sensitive system 100.

Some embodiments of the present invention are described in detail below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

If any terms in this application conflict with terms used in any application(s) from which this application claims priority, or terms incorporated by reference into this application or the application(s) from which this application claims priority, a construction based on the terms as used or defined in this application should be applied.

Touch sensitive panels or screens (thereinafter touch sensitive screens) have already been one of the main input/output devices of modern electronic systems. Moreover, touch sensitive systems which use the principle of capacitive touch sensing to detect object(s) approaching or touching the touch sensitive screen are presently the main stream implementations. Referring to FIG. 1, which is a diagram shows a touch sensitive system 100. The touch sensitive system 100 may be adapted to the abovementioned electronic systems. It includes a touch sensitive screen 110 and a touch sensitive processing apparatus 130 connecting to the touch sensitive screen 110. The touch sensitive screen 110 includes multiple first electrodes 121 being parallel with each other and multiple second electrodes 122 being parallel with each other. Multiple detecting or sensing points (thereinafter sensing points) are located where the intersections of these electrodes 121 and 122. The touch sensitive processing apparatus 130 connects to the electrodes 121 and 122 to perform self-capacitance touch sensing and/or mutual-capacitance touch sensing.

Figure 2:
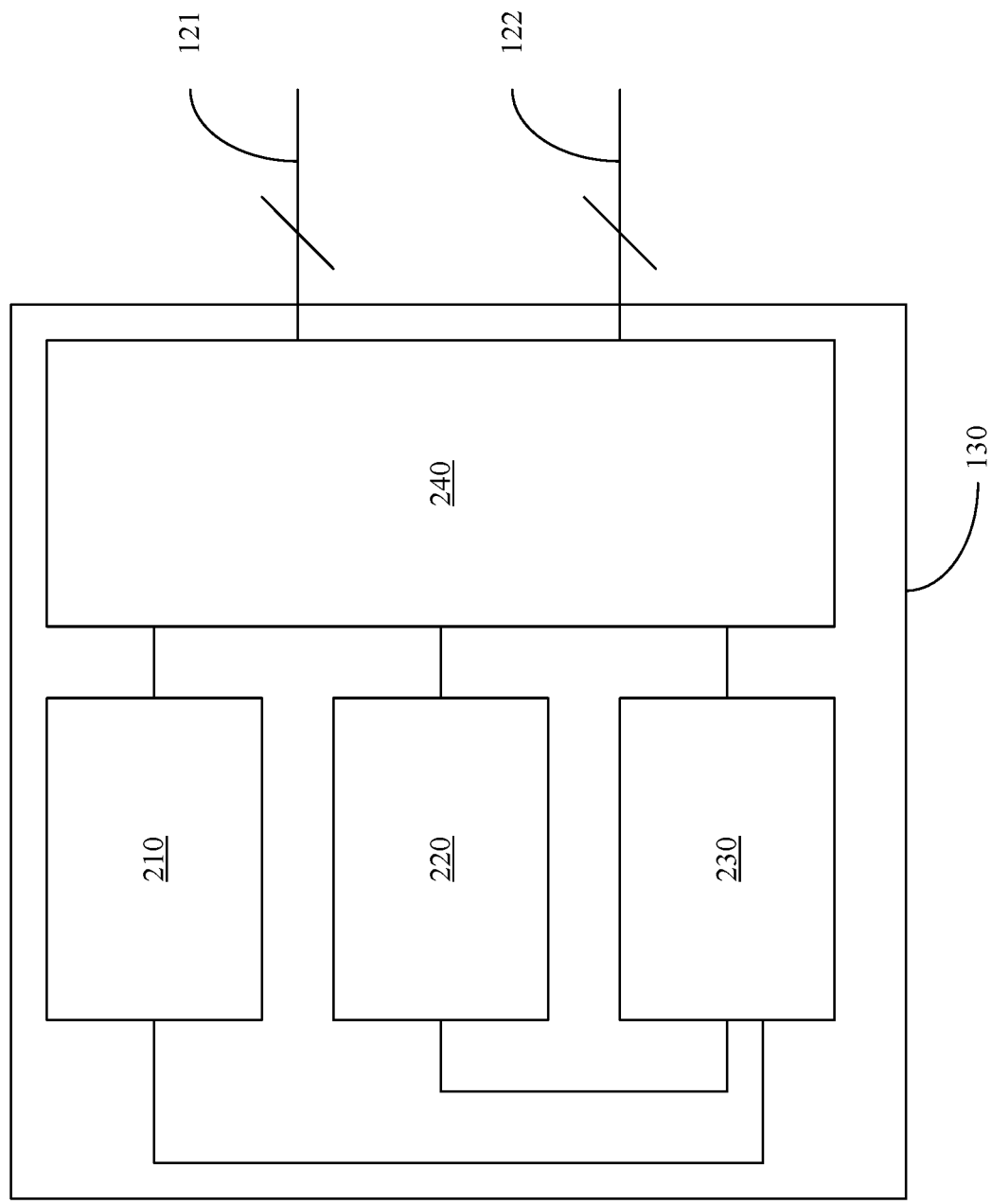
FIG. 2 shows a schematic diagram of a touch sensitive processing apparatus 130 according to an embodiment of the present invention.

Referring to FIG. 2, which is a block diagram, shows a touch sensitive processing apparatus 130 according to an embodiment of the present invention. The touch sensitive processing apparatus 130 includes a driving circuit 210, a sensing circuit 220, a processing module 230, and an interconnection network 240. The processing module 230 may include a microprocessor (or an embedded processor) configured to execute software(s) or firmware(s) to control the driving circuit 210, the sensing circuit 220, and the interconnection network 240. The interconnection network 240 is controlled by the processing module 230 and is configured to selectively connect at least one of the first electrodes 121 or second electrodes 122 to the driving circuit 210 or the sensing circuit 220. The sensing circuit 220 may be individually connected to different first electrodes 121 or second electrodes 122 to perform detecting or sensing to all electrodes at the same time which the sensing circuit 220 connects to. In some embodiments, the sensing circuit 220 may be simultaneously connected to all first electrodes 121 to perform sensing. In some embodiments, the sensing circuit 220 may be concurrently connected to all second electrodes 122 to perform sensing.

In a typical mutual-capacitance touch sensing, it includes the operation steps as follows. The driving circuit 210 of the touch sensitive processing apparatus 130 provides a driving signal to at least one of the first electrodes 121 via the interconnection network 240. Next, the sensing circuit 220 of the touch sensitive processing apparatus 130 senses or measures signal(s) from at least one of the second electrodes 122 through the interconnection network 240. The driving signal transmitted along the first electrode(s) 121 is inducted or sensed by the second electrode(s) 122. After that, the processing module 230 of the touch sensitive processing apparatus 130 processes the measured signal(s). When an external conductive object approaches or touches the first electrode(s) 121 or the second electrode(s) 122, the processing module 230 detects the signal being unusual or varied to determine the approaching or touching position of the external conductive object on the touch sensitive screen 110.

When the area of the touch sensitive screen 110 increases and the quantities of the first and the second electrodes 121 and 122 also grows, the time duration for performing mutual-capacitance touch sensing becomes longer. This phenomenon causes the touch sensitive processing apparatus 130 to have a lower rate of reporting touch sensing information to the electronic system, and further causing the response time of the electronic system to user(s) to be increased or delayed. It is not good to user's experience. Thus, one of the objects of the present invention is to provide a new touch sensitive processing method to speed up the sensing rate of capacitance touch sensing, increase the reporting frequency of touch sensing information, and further reduce the response time of the electronic system to user(s), and these developments benefit user's experience.

Figure 3:
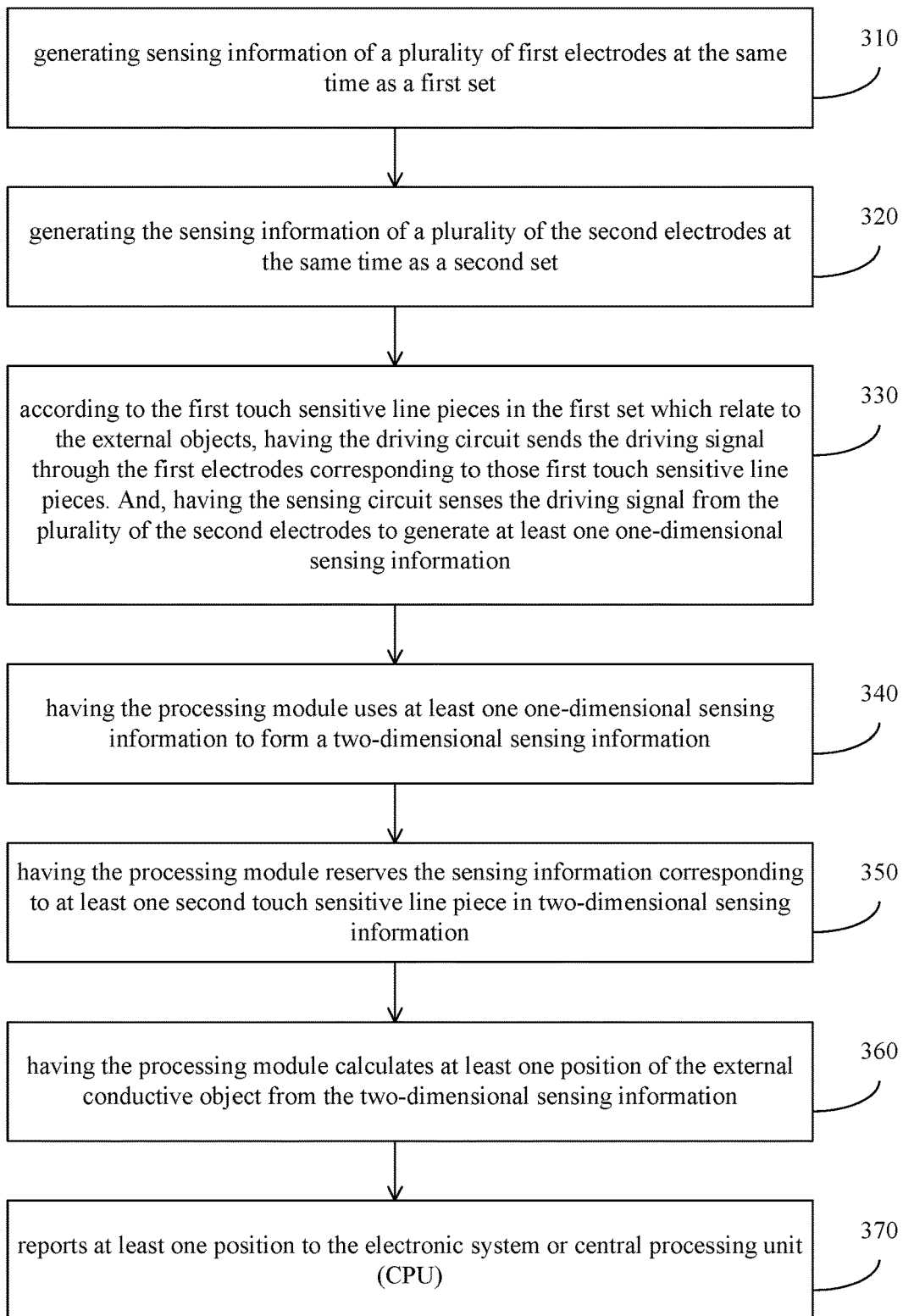
FIG. 3 shows a flowchart of a touch sensitive processing method according to an embodiment of the present invention.

Referring to FIG. 3, it shows a flowchart of a touch sensitive processing method according to an embodiment of the present invention. This method may adapt to the touch sensitive processing apparatus 130 shown in the FIGS. 1 and 2. In some embodiments, the flowchart may be implemented by software(s) and executed by the touch sensitive processing module 230, and used to control the touch sensitive processing apparatus 130. It is noted that the steps of the FIG. 3 may be performed in other order(s) or at the same time except that there is a causal relationship between the steps. Moreover, other steps may be inserted between the steps as well.

In the step 310, getting sensing information of a plurality of first electrodes 121 at the same time as a first set. In some embodiments, the sensing circuit 220 simultaneously connects to all first electrodes 121 to perform self-capacitance sensing. In a variation, the sensing circuit 220 lacks enough channels for all of the first electrodes 121 to simultaneously perform self-capacitance sensing but the sensing may be performed in batches. For example, performing self-capacitance sensing to the top half of the first electrodes 121 of the touch sensitive screen at first and then to the bottom half of the first electrodes 121 of the touch sensitive screen. Or, divided into three or four times, the step may be adjusted according to the implementation of the sensing circuit 220 in practice but it should be performed to a plurality of the first electrodes 121 in one batch. The results got from this step call the first set.

In some embodiments, the sensing circuit 220 simultaneously connects to all of the first electrodes 121 to perform mutual-capacitance sensing and the driving circuit 210 concurrently connects to all second electrodes 122 to provide the driving signal which is required by the mutual-capacitance sensing. In a variation, the sensing circuit 220 lacks enough channels for all of the first electrodes 121 to simultaneously perform mutual-capacitance sensing but the sensing may be performed in batches. For example, performing mutual-capacitance sensing to the top half of the first electrodes 121 of the touch sensitive screen at first and then to the bottom half of the first electrodes 121 of the touch sensitive screen. Or, divided into three or four times, the step may be adjusted according to the implementation of the sensing circuit 220 in practice but it should be performed to a plurality of the first electrodes 121 in one batch. Similarly, the sensing circuit 220 may lack enough channels for all of the second electrodes 122 to provide the driving signal at once but the driving may be performed in batches. The results got from the mutual-capacitance sensing still call the first set.

In the step 320, getting the sensing information of a plurality of the second electrodes 122 at the same time as a second set (or called the second set of all second electrodes 122). As described above, the self-capacitance sensing or mutual-capacitance sensing in the step 310 may be used in the step 320 by just making the interconnection network 240 alter the connections from the first electrodes 121 to the second electrodes 122.

The present invention is not limited to neither the execution orders of the steps 310 and 320 nor the same sensing method applicable to the steps 310 and 320. The first set and the second set may be got by using self-capacitance sensing or they may be got by using mutual-capacitance sensing. Alternatively, the first set may be got by using self-capacitance sensing and the second set may be got by using mutual-capacitance sensing. In a variation, the first set may be got by using mutual-capacitance sensing and the second set may be got by using self-capacitance sensing. In some cases, using self-capacitance sensing has a better signal-to-noise rate (SNR) because the signal sensed by using self-capacitance sensing is stronger. In some cases, using mutual-capacitance sensing has a better SNR because using mutual-capacitance sensing has more resistances to the interference signals in some certain frequencies. One of the preferred embodiments of the present invention adapts mutual-capacitance sensing to get the first set and the second set.

In some embodiments, the abovementioned first and second sets may be got by concurrently using self-capacitance sensing and mutual-capacitance sensing. For example, the driving circuit 210 may connect to all first electrodes 121 to provide the driving signal which mutual-capacitance sensing needs. The sensing circuit 220 may connect to all first electrodes 121 to perform self-capacitance sensing and connect to all second electrodes 122 to perform mutual-capacitance sensing. The results of self-capacitance sensing form the first set and the results of mutual-capacitance sensing form the second set. Conversely, in some embodiments, the driving circuit 210 may connect to all second electrodes 122 to provide the driving signal which mutual-capacitance sensing needs. The sensing circuit 220 may connect to all second electrodes 122 to perform self-capacitance sensing and connect to all first electrodes 121 to perform mutual-capacitance sensing. The results of mutual-capacitance sensing form the first set and the results of self-capacitance sensing form the second set.

In some embodiments, a determining step may be inserted after the step 310 to judge if the touch sensitive screen has an external conductive object on it. If it does, the flow goes to the following steps, otherwise the flow is suspended for a while to save power and execution source and then executes the step 310 again. This determining step is used to determine a signal variation between the first set and the previously measured first set for judging whether an external conductive object exists. The signal variation may be compared to a predetermined value. If it is bigger than the predetermined value, the external conductive object is determined to be existed and the flow continues the following steps. If the step 320 is performed firstly, a determining step may also be inserted after the step 320 to be used to determine a signal variation between the second set and the previously measured second set for judging whether an external conductive object exists. The signal variation may be compared to a predetermined value. If it is bigger than the predetermined value, the external conductive object is determined to be existed and the flow continues the following steps. The abovementioned previously measured first set and/or second set may be the first set and/or second set measured when the system assumed having no touch yet.

Figure 4:
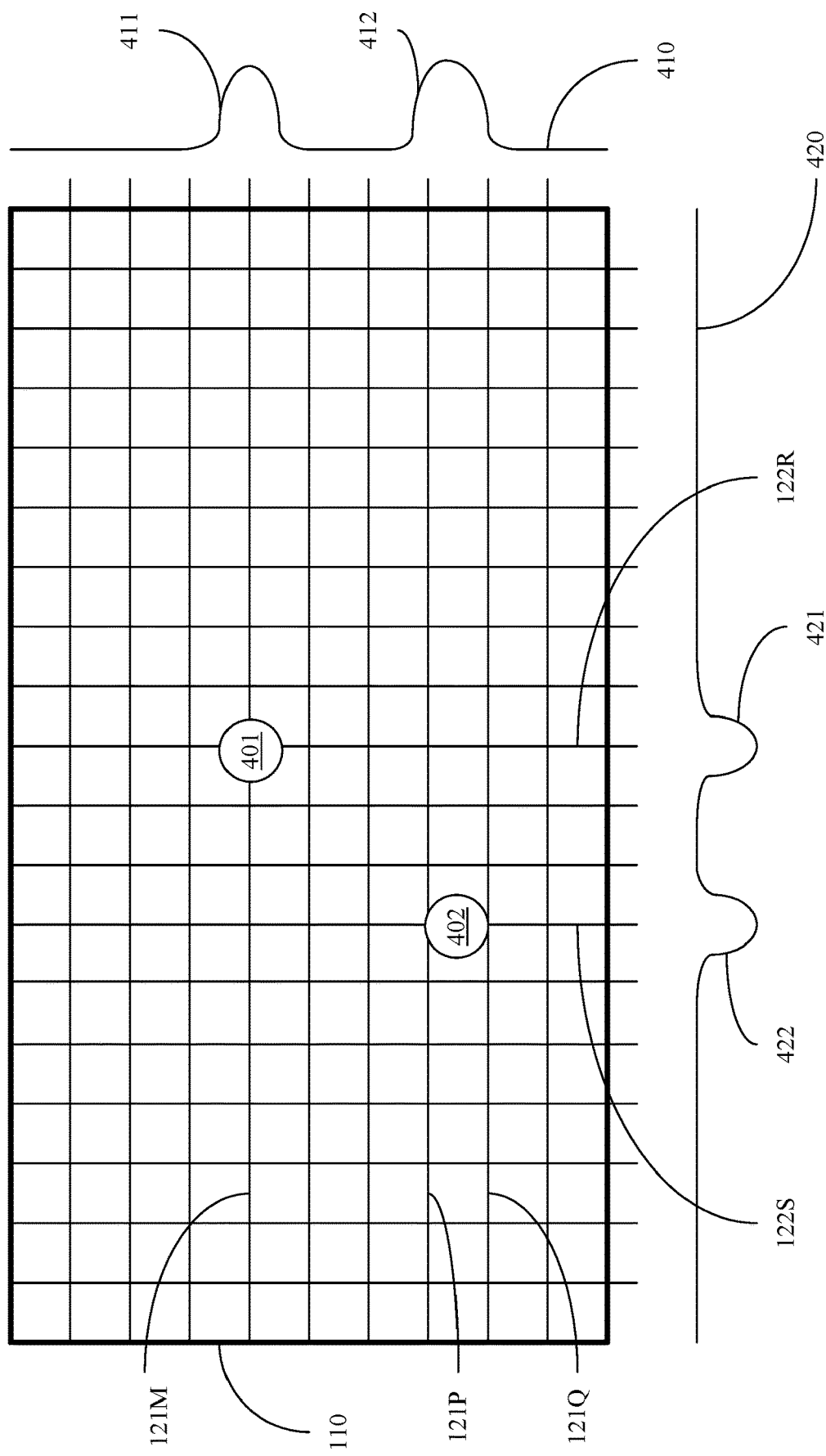
FIG. 4 shows a schematic diagram of a first set and a second set got from the embodiment shown in the FIG. 3.

Referring to FIG. 4, it shows a first set and a second set got from the embodiment shown in the FIG. 3. According to the embodiment of FIG. 3, a first set 410 is simultaneously got from the sensing information of all first electrodes 121 and a second set 420 is concurrently got from the sensing information of all second electrodes 122. When the touch sensitive screen 110 has two external conductive objects 401 and 402 on it, the first set 410 has two corresponding first touch sensitive line pieces 411 and 412, and the second set 420 also has two corresponding second touch sensitive line pieces 421 and 422. The touch sensitive line pieces 411, 412, 421, and 422 may include one or more adjacent signal value whose signal value is bigger than a predetermined value. In some embodiments, the touch sensitive line piece may be multiple adjacent signal values, it may include the signal value being bigger than the predetermined signal value and one or multiple signal values being smaller than the predetermined signal value which is/are adjacent to the signal value being bigger than the predetermined signal value.

As shown in the FIG. 4, the first touch sensitive line piece 411 corresponds to the first electrode 121M. The first touch sensitive line piece 412 corresponds to the first electrodes 121P and 121Q. The second touch sensitive line piece 421 corresponds to the second electrode 122R. The second touch sensitive line piece 422 corresponds to the second electrodes 122S. The touch sensitive line piece 411 may correspond to more than one first electrode 121 or second electrode 122. In some embodiments, the set of the first electrode 121 corresponding to a first touch sensitive line piece includes the first electrode 121 with the signal value being bigger than the predetermined signal value. In some embodiments, the set of the first electrode 121 corresponding to a first touch sensitive line piece includes the first electrode 121 being adjacent to the first electrode 121 having the signal value being bigger than the predetermined signal value.

Next, referring back to the step 330 of the embodiment of FIG. 3, according to the first touch sensitive line pieces in the first set 410 which relate to the external objects 401 and 402, having the driving circuit 210 sends the driving signal through the first electrodes 121 corresponding to those first touch sensitive line pieces. And, having the sensing circuit 220 senses the driving signal from the plurality of the second electrodes 122 to generate at least one one-dimensional sensing information. In the first set 410, except for the three first electrodes 121 (121M, 121P, 121Q), other first electrodes 121 do not correspond to the external conductive objects, and thus the mutual-capacitance sensing of these other first electrodes 121 may be omitted to save sensing time and electrical power.

Figure 5:
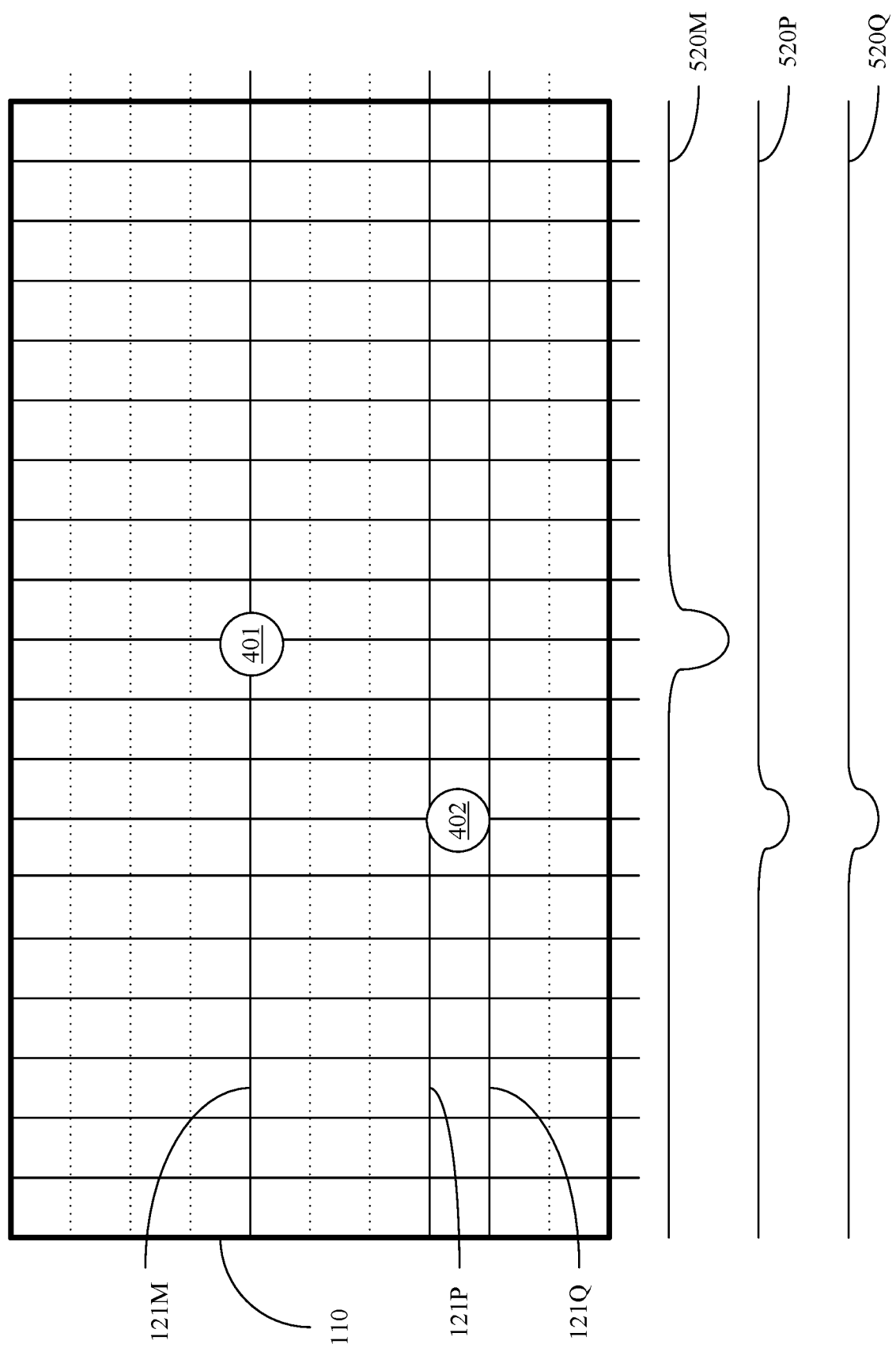
FIG. 5 shows a schematic diagram of multiple one-dimensional sensing information got from the embodiments shown in the FIGS. 3 and 4.

Referring to FIG. 5, which is a diagram shows multiple one-dimensional sensing information got from the embodiments shown in the FIGS. 3 and 4. According to the step 330 of FIG. 3, since the first touch sensitive line piece 411 corresponds to the first electrode 121M and the first touch sensitive line piece 412 corresponds to the first electrodes 121P and 121Q, the driving circuit 210 sends the driving signal to the first electrodes 121M, 121P, and 121Q, respectively. The sensing circuit 220 senses the driving signal from the plurality of second electrodes 122 and only three one-dimensional sensing information 520M, 520P, and 520Q are generated which respectively correspond to the first electrodes 121M, 121P, and 121Q.

The abovementioned first set, second set, and one-dimensional sensing information are the digital values which are converted from the analog signals sensed from the first electrodes 121 or the second electrodes 122 by an analog-to-digital converter (ADC). In the prior art, mutual-capacitance scanning for full screen is adapted, that is, sending the driving signal to each first electrode 121 in turn to get multiple one-dimensional sensing information corresponding to all first electrodes 121. It takes a lot of time. In the step 330, for example, the driving circuit 210 only sends the driving signal to the first electrodes 121 corresponding to the first line pieces 411 and 412 related to the external conductive objects. It takes less time and fewer quantities of one-dimensional sensing information are received as well. Compared to mutual-capacitance scanning for full screen in the prior art, the steps 310 and 330 may provide several times or ten times of scanning rate.

Next, referring back to the step 340 of the embodiment of FIG. 3, having the processing module 230 uses at least one one-dimensional sensing information to form a two-dimensional sensing information. Since the numbers of the first electrodes 121 and the second electrodes 122 are fixed and there are 'X' first electrodes 121 and 'Y' second electrodes 122, for example, are assumed, an image of two-dimensional sensing information in size of 'X' multiplied by 'Y' may be got if the whole touch sensitive screen 110 is sensed by using mutual-capacitance sensing. In the step 340, it just puts the one-dimensional sensing information got from the step 330 into the image and other values may be ignored or set as zeros. In some embodiments, for example, the processing module may initialize an image (or two-dimensional sensing information), i.e., setting every value to zero, and then puts corresponding one-dimensional sensing information into the image.

Figure 6:
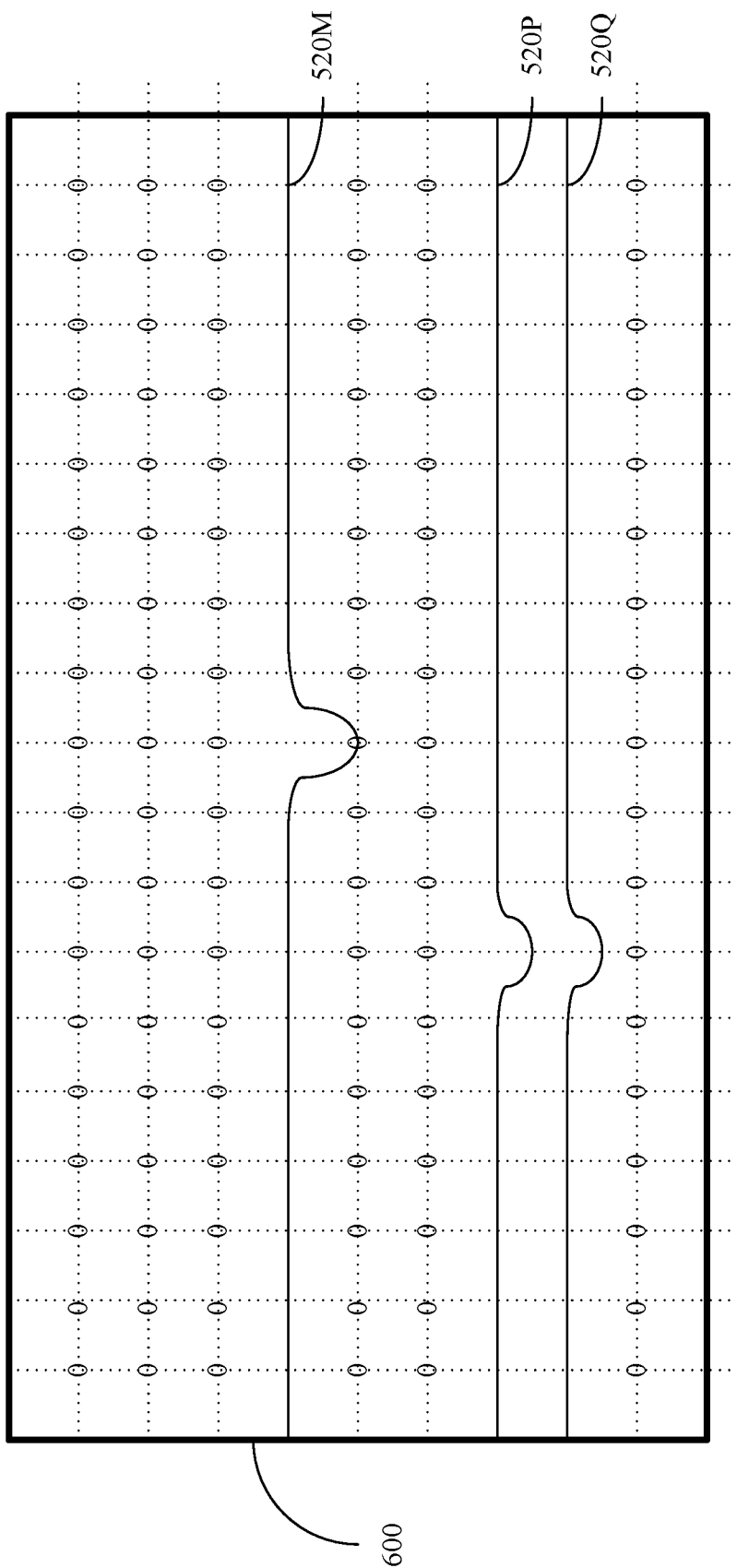
FIG. 6 shows a schematic diagram of a two-dimensional sensing information 600 got from the embodiments shown in the FIGS. 3 and 4.

Referring to FIG. 6, which is a diagram shows a two-dimensional sensing information 600 got from the embodiments shown in the FIGS. 3 and 4. As described above, except for the three one-dimensional sensing information 520M, 520P, and 520Q, every sensing information value is set to zero. Moreover, each sensing information value included in the three one-dimensional sensing information 520M, 520P, and 520Q is put to the corresponding position of the first electrodes 121M, 121P, and 121Q.

Next, referring back to the step 350 of the embodiment of FIG. 3, having the processing module 230 reserves the sensing information corresponding to at least one second touch sensitive line piece in two-dimensional sensing information. The at least one second touch sensitive line piece is the part relating to the external conductive object(s) in the second set. Step 350 is further aimed to reduce the amount of effective information in the two-dimensional sensing information to benefit step 360 in follow-up position-calculating.

Figure 7:
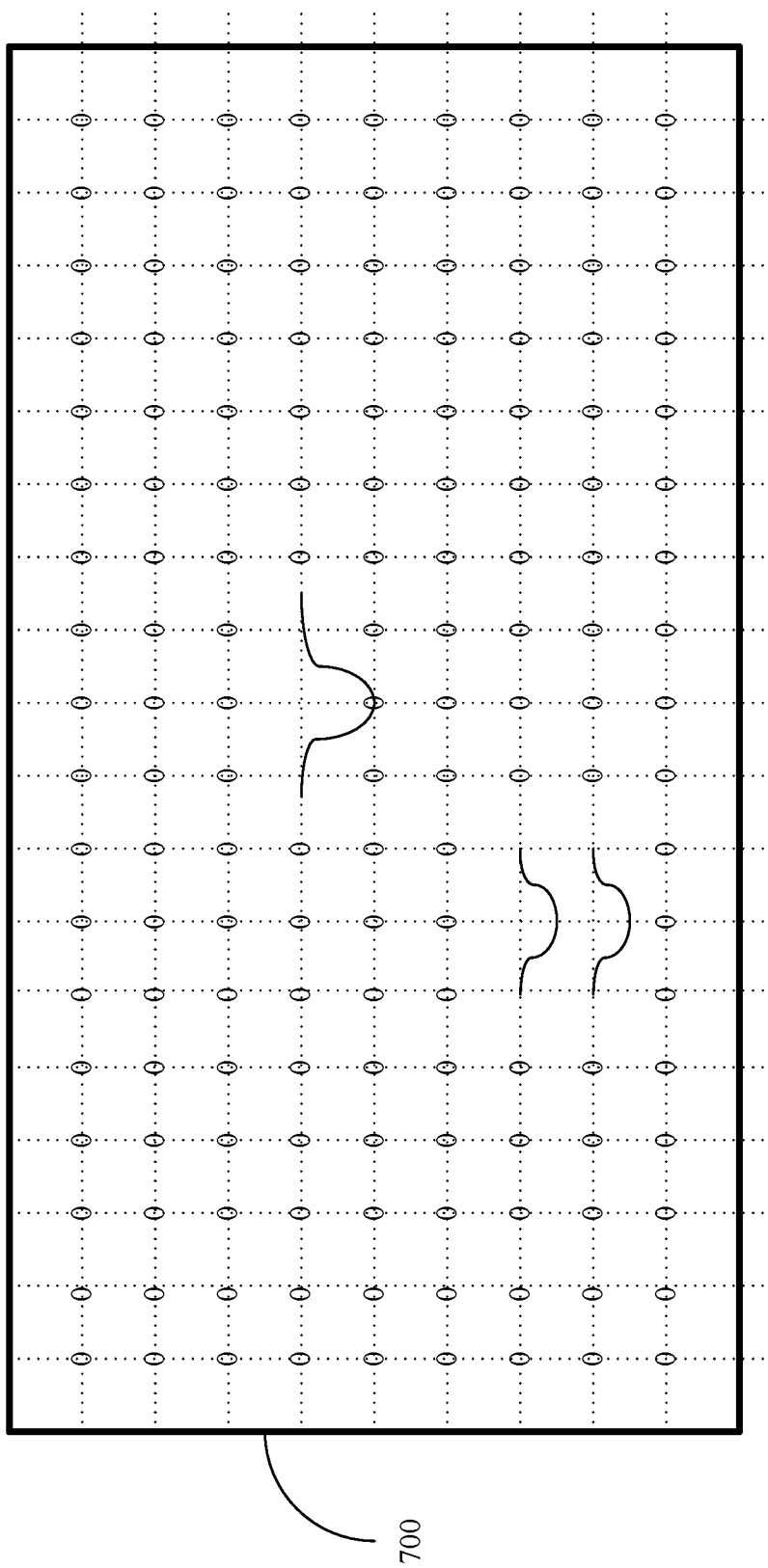
FIG. 7 shows a schematic diagram of a two-dimensional sensing information 700 got from the embodiments shown in the FIGS. 3 and 4.

Referring to FIG. 7, which is a diagram shows a two-dimensional sensing information 700 got from the embodiments of FIGS. 3 and 4. In the step 340, a two-dimensional sensing information 600 is formed. Then, in the step 350, the two-dimensional sensing information 600 is further amended to the two-dimensional sensing information 700 according to the information of the second set 420. As shown in the FIG. 4, the second electrodes 122 corresponding to the second touch sensitive line piece 421 include the second electrode 122R and two adjacent second electrodes thereof. The second electrodes 122 relating to the second touch sensitive line piece 422 include the second electrode 122S and the two adjacent second electrodes thereof. Therefore, in the two-dimensional sensing information 600, only the sensing information corresponding to the six second electrodes, such as the second electrodes 122R and 122S and the adjacent second electrodes thereof respectively, is needed to be reserved and the others may be set to zero. As it can be seen in the two-dimensional sensing information 700 in FIG. 7, there are three adjacent non-zero values corresponding to the position of the external conductive object 401, and there are six adjacent non-zero values corresponding to the positions of the external conductive objects 402.

Next, referring back to the step 360 of the embodiment of the FIG. 3, having the processing module 230 calculates at least one position of the external conductive object from the two-dimensional sensing information. For example, the two-dimensional sensing information 700 shown in the FIG. 7 is used to calculate the two positions of the external conductive objects 401 and 402. Finally, the step 370 is performed. The processing module 230, for example, reports at least one position to the electronic system or central processing unit (CPU).

In general, the processing module 230 includes special touch sensitive position calculating function or routine to be able to process the two-dimensional sensing information in size of 'X' multiplied by 'Y' or the image of full-screen touch sensing. Wherein, the size of the two-dimensional sensing information is fixed. Furthermore, the embodiment shown in the FIG. 3, the signal values which do not relate to the external conductive objects in the image of full-screen touch sensing are set to zeros according to the first set and the second set. The image of full-screen touch sensing without noise may speed up the processing rate of the touch sensitive position calculating function and increase the frequency of position reporting. If the mutual-capacitance of traditional full-screen touch sensing is adapted, somewhere noises may lead to non-zero value(s). For processing these noises, the touch sensitive position calculating function may use extra source or time. This slows down the processing rate and delays the frequency of position reporting.

In some embodiments, the processing module 230 may include another touch sensitive position calculating function or routine which may calculate the position(s) corresponding to the external conductive object(s) according to line piece group(s). The line piece group here is the set of adjacent line pieces with at least one adjacent non-zero value.

Figure 8:
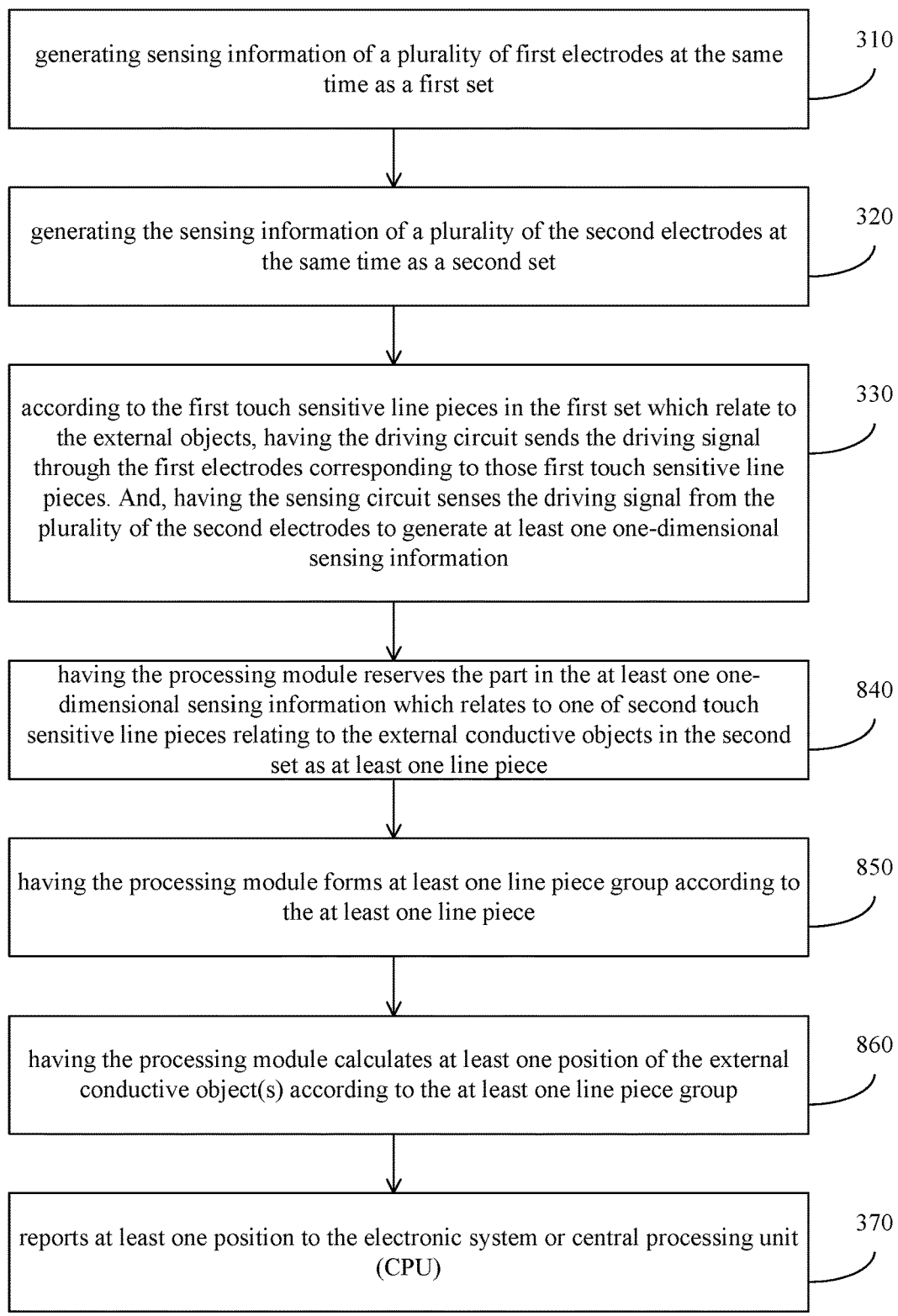
FIG. 8 shows a flowchart of a variation of the flowchart shown in the FIG. 3.

Referring to FIG. 8, which is a flowchart shows a variation of the flowchart shown in the FIG. 3. The first three steps 310-330 and step 370 are the same as the embodiment of the FIG. 3, and they do not be repeatedly described here. In the step 840, for example, having the processing module 230 reserves the part in the at least one one-dimensional sensing information which relates to one of second touch sensitive line pieces relating to the external conductive objects in the second set as at least one line piece.

Figure 9:
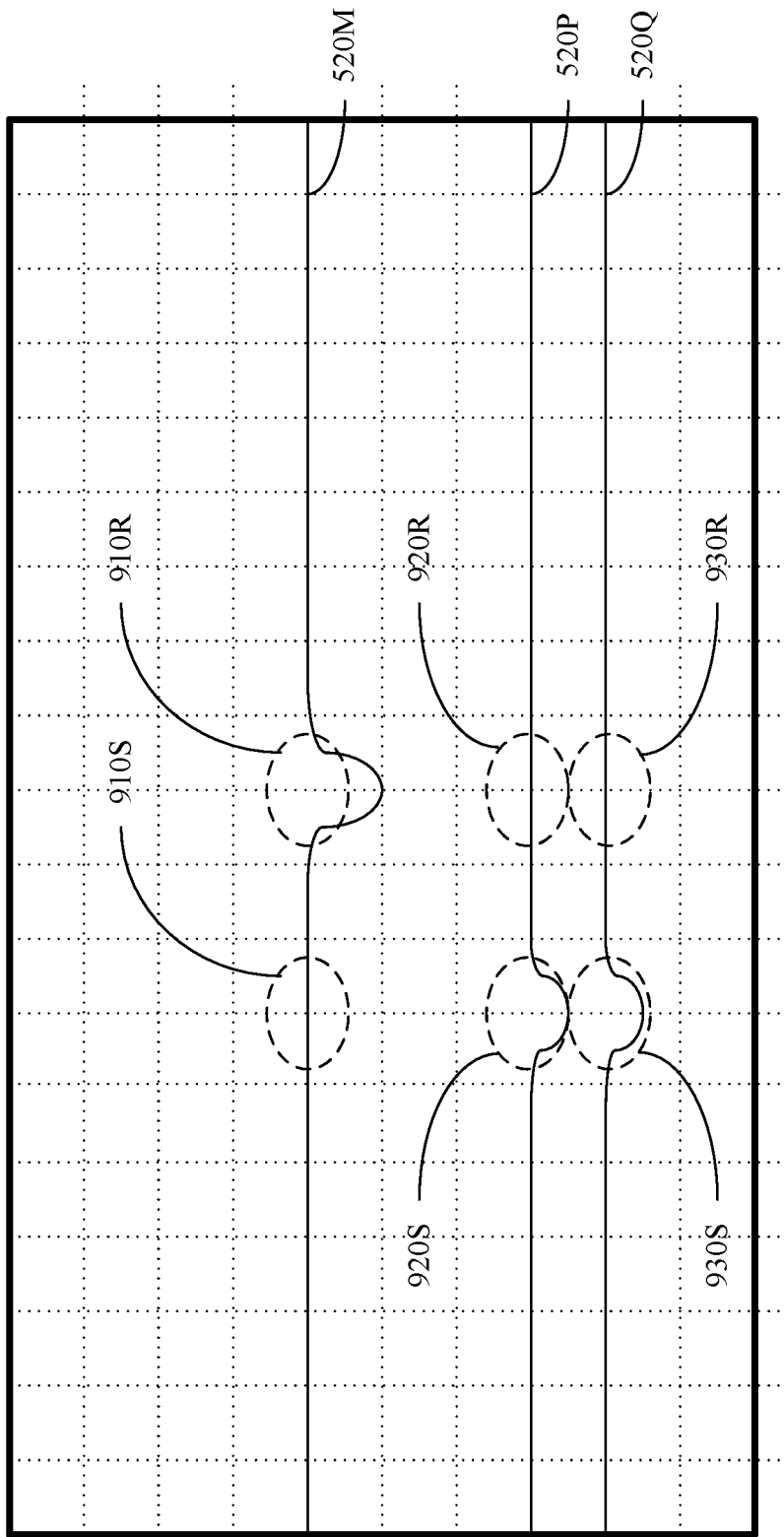
FIG. 9 shows a schematic diagram of the positions of line pieces got from the embodiments shown in the FIGS. 4 and 5.

Referring to FIG. 9, which is a diagram shows the positions of line pieces got from the embodiments shown in the FIGS. 4 and 5. In one embodiment of the FIG. 4, the second set 420 shows the second electrodes relating to the external conductive objects which include the second electrodes 122R and 122S in total of two. Therefore, in the step 840, the values in one-dimensional sensing information 520M which relate to these two second electrodes 122R and 122S are reserved to form line pieces 910R and 910S. The values in one-dimensional sensing information 520P which relate to these two second electrodes 122R and 122S are reserved to form line pieces 920R and 920S. The values in one-dimensional sensing information 520Q which relate to these two second electrodes 122R and 122S are reserved to form line pieces 930R and 930S.

Figure 10:
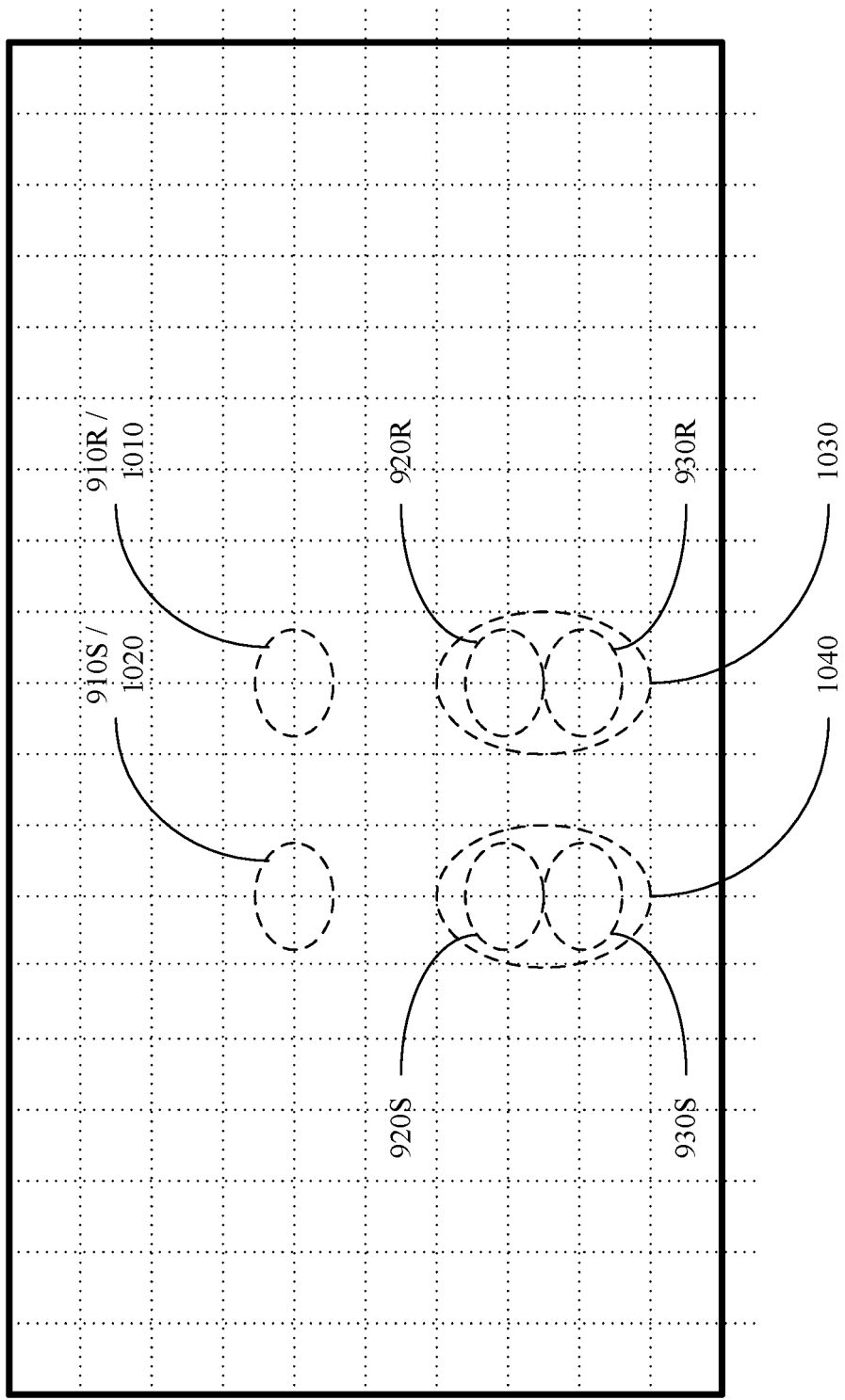
FIG. 10 shows a schematic diagram of the positions of line piece groups got from the embodiment of the FIG. 9.

Next, referring back to the embodiment of FIG. 8, in the step 850, having the processing module 230 forms at least one line piece group according to the at least one line piece. Please referring to FIG. 10, which is a diagram shows the positions of line piece groups got from the embodiment of the FIG. 9. Since the line pieces 910R and 910S have no adjacent line piece, they form the line piece group 1010 and 1020, respectively. The line pieces 920R and 930R are adjacent and at least one adjacent non-zero value exists between them, thus the processing module 230 takes the line pieces 920R and 930R to form another line piece group 1030. The line pieces 920S and 930S are adjacent and at least one adjacent non-zero value exists between them, thus the processing module 230 takes the line pieces 920S and 930S to form another line piece group 1040.

Next, referring back to the embodiment of FIG. 8, in the step 860, having the processing module 230 calculates at least one position of the external conductive object(s) according to the at least one line piece group. In other words, the processing module 230 calculates the position of the external conductive object 401 according to the line piece group 1010 and works out the position of the external conductive object 402 according to the line piece group 1040. As to the line piece groups 1020 and 1030, since the signal values contained are all zero, the step 860 is able to quickly determine that these two line piece groups 1020 and 1030 do not correspond to any external conductive object.

Figure 11:
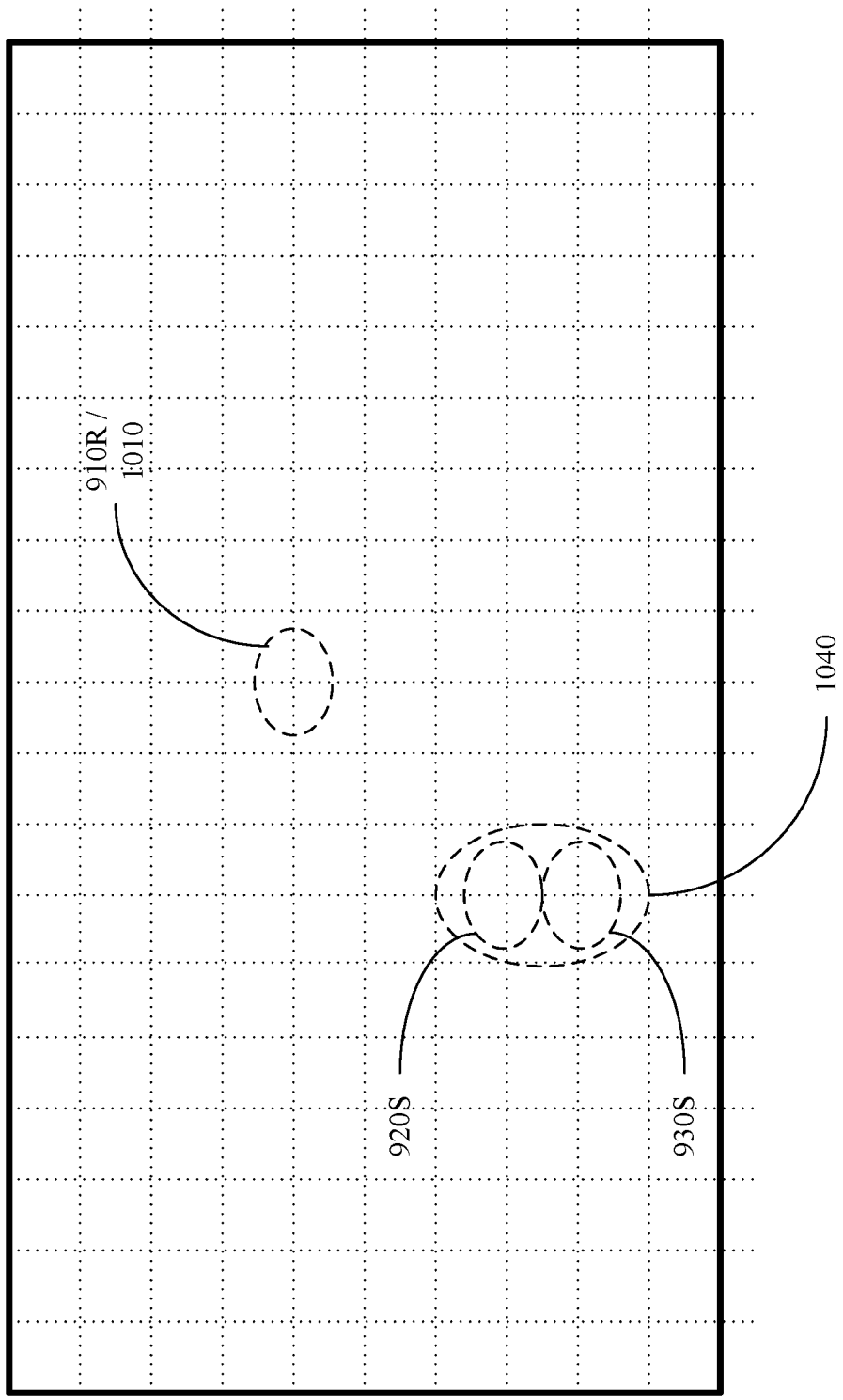
FIG. 11 shows a schematic diagram of the positions of line piece groups got from the embodiment of the FIG. 8.

In some embodiments, the step 850 may further include determining whether each value of each line piece is zero or not. If it is, the line piece is deleted before forming line piece group. For example, the values of the line piece 910S are all zero, in the step 850, the line piece 910S may be deleted. It is unnecessary to form the line piece group 1020. Furthermore, the values of the line piece 920R and 930R are respectively all zero, in the step 850, the line pieces 920R and 930R may be deleted. It is unnecessary to form the line piece group 1030. Please refer to FIG. 11, which is a diagram shows the results of this embodiment.

The abovementioned steps 350 and 840 provide the solution to accelerate the software operation (or calculation) by identifying the second electrode(s) relating to the external conductive object(s) in the second set. They may limit the software operation to the part of the first touch sensitive line piece(s) relating the external conductive object(s) in the corresponding second set in the two-dimensional sensing information or full-screen touch sensitive image. For example, in most cases which the screen size is larger than 14-inch, the area(s) of touch(es) occupies less than 10% of a single axis of the screen. Therefore, compared to the image operation in full-screen touch sensing, the steps 350 and 840 limit the quantity of image operation to the area less than 10%, and substantially speeding up the operation and reducing the quantity of operation.

Besides, the abovementioned step 330 provides the solution to accelerate hardware scanning by identifying the (second) touch sensitive line piece(s) relating to the external conductive object(s) in the first set. It may limit the hardware to the first touch sensitive line piece(s) relating the external conductive object(s) in the first set. For example, in most cases which the screen size is larger than 14-inch, the area(s) touch(es) occupies less than 10% of a single axis of the screen. Therefore, compared to full-screen scanning, step 330 may limit the hardware scanning to the area less than 10%, and substantially speeding up scanning, saving power, and reducing electromagnetic interference (EMI). Especially, massive and fast full-screen scannings in mobile devices are prone to interfere with wireless communication (such as mobile communication, wireless local network WiFi, and so on). It also interferes with the pixel-refreshing operations to the touch screen itself and wastes a lot of power. The step 330 may effectively solve this kind of problem. To sum up, one of the objects of the present invention is to provide two novel touch sensitive processing methods. They may reduce the effect of the operation speed affected by noise, speed up the detecting speed of capacitive touch, increase the reporting frequency of touch sensing information, and further shorten the response time for electronic system to user's touch. It is good to user's experience.

Also, the present invention does not limit how to get the first set and the second set. They may be got by using mutual-capacitance sensing and/or self-capacitance sensing in order to get better results under various environments with EMI.

Furthermore, when the touch sensitive method uses the first set or second set to determine that there is no any external conductive object on the touch sensitive screen, it may report no-touch immediately to increase the reporting frequency of touch sensing information and reduce the power and operation source required by the touch sensitive processing apparatus.

According to one embodiment of the present invention, it provides a touch sensitive processing apparatus configured to connect a touch sensitive panel or screen. The touch sensitive panel or screen includes multiple first electrodes being parallel with a first axis and multiple second electrodes being parallel with a second axis. Multiple sensing points are formed by the intersections of the multiple first electrodes and the multiple second electrodes. The touch sensitive processing apparatus includes a driving circuit, a sensing circuit, and a processing module for controlling the driving circuit and the sensing circuit. The processing module reads programs from a non-volatile memory and executes them for performing the following steps: generating sensing information sensed by the multiple first electrodes simultaneously from the sensing circuit as a first set; generating sensing information sensed by the multiple second electrodes at the same time from the sensing circuit as a second set; according to one or more first touch line pieces corresponding to one or more external objects in the first set, having the driving circuit transmit driving signals via one or more first electrodes corresponding to the one or more first touch line pieces, and having the sensing circuit sense the driving signals via the multiple second electrodes to form at least a one-dimensional sensing information; composing a two-dimensional sensing information according to the at least a one-dimensional sensing information; preserving sensing information which corresponds to one or more second touch line pieces in the two-dimensional sensing information, wherein the one or more second touch line pieces is a part of a second set which corresponds to the one or more external objects; calculating one or more positions of the one or more external objects according to the two-dimensional sensing information; and reporting the one or more positions.

In one embodiment, for getting better results in various electromagnetic interference (EMI) environments, the first set or the second set is generated by using self-capacitance sensing.

In one embodiment, for getting better results in various electromagnetic interference (EMI) environments, the first set or the second set is generated by using mutual-capacitance sensing.

In one embodiment, for speeding up the step of calculating position(s) according to the two-dimensional sensing information, in the step of composing the two-dimensional sensing information, the sensing information being irrelevant to the at least a one-dimensional sensing information is set to zero.

In one embodiment, for speeding up the step of calculating position(s) according to the two-dimensional sensing information, in the step of preserving, the sensing information in the at least a one-dimensional sensing information which is irrelevant to the second touch line piece is set to zero.

In one embodiment, for speeding up the step of calculating position(s) according to the two-dimensional sensing information, the processing module further includes a hardware accelerated computing module configured for receiving the two-dimensional sensing information and calculating the one or more positions of the one or more external objects.

According to one embodiment of the present invention, it provides a touch sensitive processing system. The touch sensitive processing system includes the abovementioned touch sensitive panel or screen and the aforesaid touch sensitive processing apparatus.

According to one embodiment of the present invention, it provides a touch sensitive processing method adaptive for a touch sensitive processing apparatus. The touch sensitive processing apparatus connects a touch sensitive panel or screen. The touch sensitive panel or screen includes multiple first electrodes being parallel with a first axis and multiple second electrodes being parallel with a second axis. Multiple sensing points are formed by the intersections of the multiple first electrodes and the multiple second electrodes. The touch sensitive processing method includes: generating sensing information sensed by the multiple first electrodes simultaneously from a sensing circuit of the touch sensitive processing apparatus as a first set; generating sensing information sensed by the multiple second electrodes at the same time from the sensing circuit as a second set; according to one or more first touch line pieces corresponding to one or more external objects in the first set, having a driving circuit of the touch sensitive processing apparatus transmit driving signals via one or more first electrodes corresponding to the one or more first touch line pieces, and having the sensing circuit sense the driving signals via the multiple second electrodes to form at least a one-dimensional sensing information; composing a two-dimensional sensing information according to the at least a one-dimensional sensing information; preserving sensing information which corresponds to one or more second touch line pieces in the two-dimensional sensing information, wherein the one or more second touch line pieces is a part of a second set which corresponds to the one or more external objects; calculating one or more positions of the one or more external objects according to the two-dimensional sensing information; and reporting the one or more positions.

In one embodiment, for getting better results in various electromagnetic interference (EMI) environments, it further includes using mutual-capacitance sensing to generate the first set or the second set.

In one embodiment, for getting better results in various electromagnetic interference (EMI) environments, it further includes using self-capacitance sensing to generate the first set or the second set.

In one embodiment, for speeding up the step of calculating position(s) according to the two-dimensional sensing information, in the step of composing the two-dimensional sensing information, the sensing information being irrelevant to the at least a one-dimensional sensing information is set to zero.

In one embodiment, for speeding up the step of calculating position(s) according to the two-dimensional sensing information, in the step of preserving, the sensing information in the at least a one-dimensional sensing information which is irrelevant to the second touch line piece is set to zero.

In one embodiment, for speeding up the step of calculating position(s) according to the two-dimensional sensing information, it further includes having a hardware accelerated computing module of the processing module receive the two-dimensional sensing information and calculate the one or more positions of the one or more external objects.

According to one embodiment of the present invention, it provides a touch sensitive processing apparatus configured to connect a touch sensitive panel or screen. The touch sensitive panel or screen includes multiple first electrodes being parallel with a first axis and multiple second electrodes being parallel with a second axis. Multiple sensing points are formed by the intersections of the multiple first electrodes and the multiple second electrodes. The touch sensitive processing apparatus includes a driving circuit, a sensing circuit, and a processing module for controlling the driving circuit and the sensing circuit. The processing module reads programs from a non-volatile memory and executes them for performing the following steps: generating sensing information sensed by the multiple first electrodes simultaneously from the sensing circuit as a first set; generating sensing information sensed by the multiple second electrodes at the same time from the sensing circuit as a second set; according to one or more first touch line pieces corresponding to one or more external objects in the first set, having the driving circuit transmit driving signals via one or more first electrodes corresponding to the one or more first touch line pieces, and having the sensing circuit sense the driving signals via the multiple second electrodes to form at least a one-dimensional sensing information; preserving a part of the at least a one-dimensional sensing information which corresponds to at least one second touch line piece of the one or more external objects in the second set to be at least one line piece; composing at least one line piece group according to the at least one line piece; calculating one or more positions of the one or more external objects according to the at least one line piece group; and reporting the one or more positions.

In one embodiment, for getting better results in various electromagnetic interference (EMI) environments, the first set or the second set is generated by using self-capacitance sensing.

In one embodiment, for getting better results in various electromagnetic interference (EMI) environments, the first set or the second set is generated by using mutual-capacitance sensing.

In one embodiment, for reducing processing time in false line piece, before the step of composing line piece group, the processing module further determines whether all values of each sensing information of each line piece are zero, if yes, delete the line piece.

According to one embodiment of the present invention, it provides a touch sensitive processing system. The touch sensitive processing system includes the abovementioned touch sensitive panel or screen and the aforesaid touch sensitive processing apparatus.

According to one embodiment of the present invention, it provides a touch sensitive processing method adaptive for a touch sensitive processing apparatus. The touch sensitive processing apparatus connects a touch sensitive panel or screen. The touch sensitive panel or screen includes multiple first electrodes being parallel with a first axis and multiple second electrodes being parallel with a second axis. Multiple sensing points are formed by the intersections of the multiple first electrodes and the multiple second electrodes. The touch sensitive processing method includes: generating sensing information sensed by the multiple first electrodes simultaneously from a sensing circuit of the touch sensitive processing apparatus as a first set; generating sensing information sensed by the multiple second electrodes at the same time from the sensing circuit as a second set; according to one or more first touch line pieces corresponding to one or more external objects in the first set, having a driving circuit of the touch sensitive processing apparatus transmit driving signals via one or more first electrodes corresponding to the one or more first touch line pieces, and having the sensing circuit sense the driving signals via the multiple second electrodes to form at least a one-dimensional sensing information; having a processing module of the touch sensitive processing apparatus preserve a part of the at least a one-dimensional sensing information which corresponds to at least one second touch line piece of the one or more external objects in the second set to be at least one line piece; having the processing module compose at least one line piece group according to the at least one line piece; having the processing module calculate one or more positions of the one or more external objects according to the at least one line piece group; and having the processing module report the one or more positions.

In one embodiment, for getting better results in various electromagnetic interference (EMI) environments, it further includes using mutual-capacitance sensing to generate the first set or the second set.

In one embodiment, for getting better results in various electromagnetic interference (EMI) environments, it further includes using self-capacitance sensing to generate the first set or the second set.

In one embodiment, for reducing processing time in false line piece, before the step of composing line piece group, it further includes determining whether all values of each sensing information of each line piece are zero, if yes, deleting the line piece.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive processing apparatus configured to connect a touch sensitive panel or screen, wherein the touch sensitive panel or screen includes multiple first electrodes being parallel with a first axis and multiple second electrodes being parallel with a second axis, multiple sensing points are formed by the intersections of the multiple first electrodes and the multiple second electrodes, the touch sensitive processing apparatus comprising:
   a driving circuit;
   a sensing circuit; and
   a processing module, configured for controlling the driving circuit and the sensing circuit, wherein the processing module reads programs from a non-volatile memory and executes them for performing following steps:
      generating sensing information sensed by the multiple first electrodes simultaneously from the sensing circuit as a first set;
      generating sensing information sensed by the multiple second electrodes at the same time from the sensing circuit as a second set;
      according to one first touch line piece corresponding to one external object in the first set, having the driving circuit transmit driving signals via the first electrodes corresponding to the one first touch line piece, and having the sensing circuit sense the driving signals via the multiple second electrodes to form more than one neighboring one-dimensional sensing information;
      reserving parts of the neighboring one-dimensional sensing information which corresponds to one second touch line piece of the external object in the second set to be line pieces;
      composing one line piece group according to the line pieces;
      calculating one position of the external object according to the line piece group; and
      reporting the position.

2. The touch sensitive processing apparatus of claim 1, wherein the first set or the second set is generated by using self-capacitance sensing.

3. The touch sensitive processing apparatus of claim 1, wherein the first set or the second set is generated by using mutual-capacitance sensing.

4. The touch sensitive processing apparatus of claim 1, wherein the processing module further determines whether all values of each sensing of the reserved line pieces are zero; and deletes the reserved line pieces if all values of the reserved line pieces are determined all zero.

5. A touch sensitive system comprising the touch sensitive panel or screen and the touch sensitive processing apparatus as recited in claim 1.

6. A touch sensitive processing method adaptive for a touch sensitive processing apparatus which is configured to connect to a touch sensitive panel or screen, wherein the touch sensitive panel or screen includes multiple first electrodes being parallel with a first axis and multiple second electrodes being parallel with a second axis, multiple sensing points are formed by the intersections of the multiple first electrodes and the multiple second electrodes, the touch sensitive processing method comprising:
   generating sensing information sensed by the multiple first electrodes simultaneously from a sensing circuit of the touch sensitive processing apparatus as a first set;
   generating sensing information sensed by the multiple second electrodes at the same time from the sensing circuit as a second set;
   according to one first touch line piece corresponding to one external object in the first set, having a driving circuit of the touch sensitive processing apparatus transmit driving signals via the first electrodes corresponding to the first touch line piece, and having the sensing circuit sense the driving signals via the multiple second electrodes to form more than one neighboring one-dimensional sensing information;
   having a processing module of the touch sensitive processing apparatus reserve parts of the neighboring one-dimensional sensing information which corresponds to one second touch line piece of the external object in the second set to be line pieces;
   having the processing module compose one line piece group according to the line pieces;
   having the processing module calculate one position of the external object according to the line piece group; and
   having the processing module report the position.

7. The touch sensitive processing method of claim 6 further comprises:
   using self-capacitance sensing to generate the first set or the second set.

8. The touch sensitive processing method of claim 6 further comprises:
   using mutual-capacitance sensing to generate the first set or the second set.

9. The touch sensitive processing method of claim 6 further comprises:
   determining whether all values of each sensing of the reserved line pieces are zero; and
   deleting the reserved line piece if all values of the reserved line pieces are determined all zero.

* * * * *